(12) United States Patent
Iwasaki

(10) Patent No.: US 7,254,418 B2
(45) Date of Patent: Aug. 7, 2007

(54) SYSTEM, METHOD, APPARATUS, CONTROL METHOD THEREOF AND COMPUTER PROGRAM FOR WIRELESS COMMUNICATIONS

(75) Inventor: Jun Iwasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 477 days.

(21) Appl. No.: 10/316,913

(22) Filed: Dec. 12, 2002

(65) Prior Publication Data

US 2003/0125083 A1 Jul. 3, 2003

(30) Foreign Application Priority Data

Dec. 19, 2001 (JP) ............................. 2001-386741

(51) Int. Cl.
*H04B 10/10* (2006.01)
(52) U.S. Cl. ...................... 455/558; 455/411; 455/418
(58) Field of Classification Search ................ 455/558, 455/556.1, 556.2, 557, 411, 418; 370/313
See application file for complete search history.

(56) References Cited

U.S. PATENT DOCUMENTS 5,987,325 A * 11/1999 Tayloe ..................... 455/435.2
6,442,532 B1 * 8/2002 Kawan ..................... 705/36 R
6,466,804 B1 * 10/2002 Pecen et al. ................ 455/558
6,657,538 B1 * 12/2003 Ritter ........................ 340/5.81
6,717,801 B1 * 4/2004 Castell et al. ............... 361/683
6,889,246 B1 * 5/2005 Kawamoto et al. ......... 709/204

FOREIGN PATENT DOCUMENTS

JP 05-336035 12/1993
JP 09-084137 3/1997

* cited by examiner

*Primary Examiner*—Edward F. Urban
*Assistant Examiner*—Adeel Haroon
(74) *Attorney, Agent, or Firm*—Oblon, Spivak, McClelland, Maier & Neustadt, P.C.

(57) ABSTRACT

A PAN is easily constructed by carrying out mutual authentication with a plurality of equipment in a home. A memory card is used to mutually authenticate any random equipment among a plurality of equipment set up at home, and a piece of desired communications equipment is chosen among a plurality of communicatable equipment exist in the communications range and is made communicable. Features of each equipment may be written in the memory card which can be distributed in advance. Before carrying out communications, the type of data, transmission rate, and other data can be established so that efficient transmission is enabled. In addition, the user can easily form a PAN. For example, even while traveling, the user can easily connects to a network the audio-visual equipment at a hotel in a destination.

15 Claims, 12 Drawing Sheets

F I G. 1
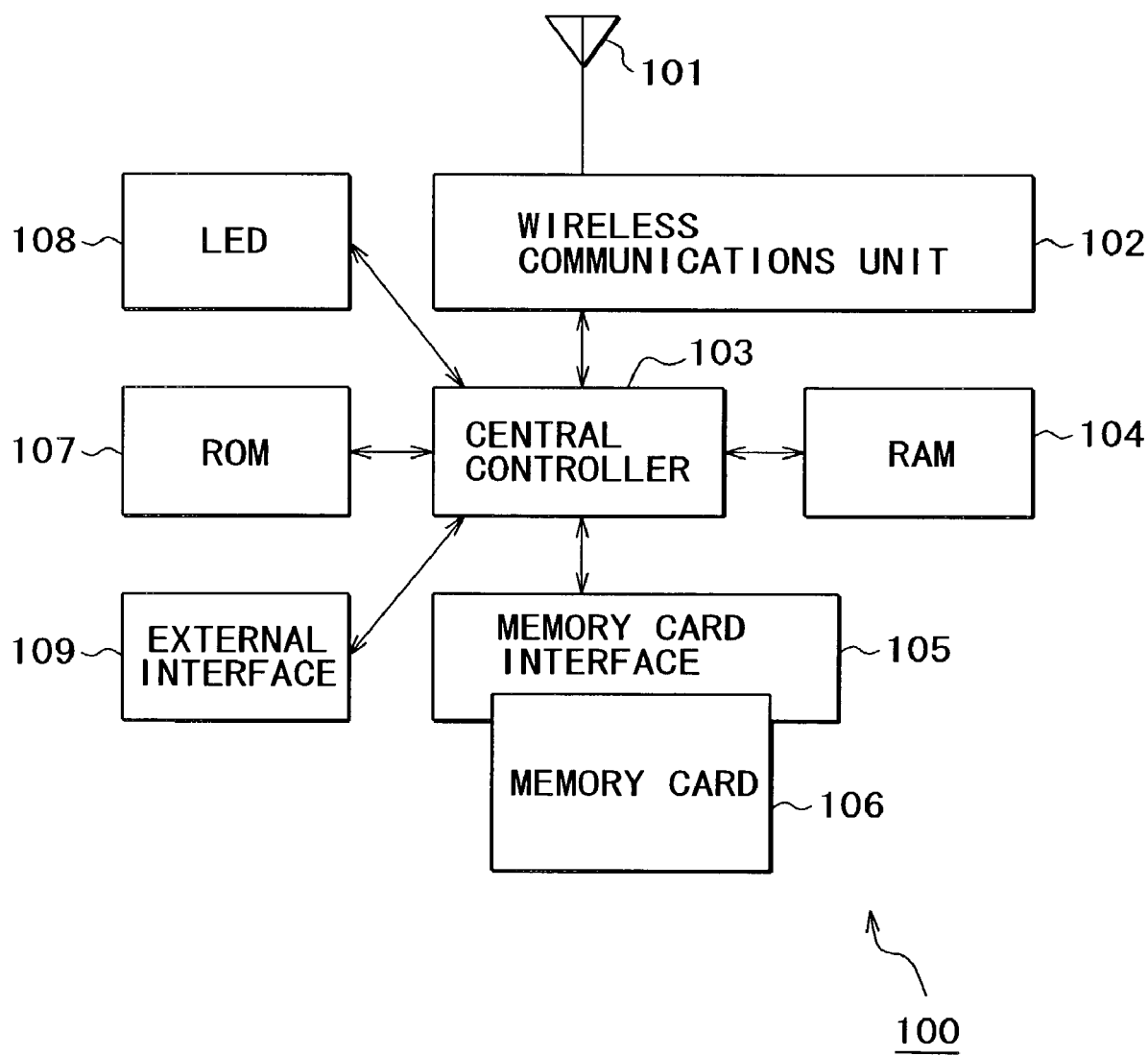

SYSTEM, METHOD, APPARATUS, CONTROL METHOD THEREOF AND COMPUTER PROGRAM FOR WIRELESS COMMUNICATIONS

CROSS REFERENCE TO RELATED APPLICATIONS

The present document is based on Japanese Priority Document JP2001-386741, filed in the Japanese Patent Office on Dec. 19, 2001, the entire contents of which being incorporated herein by reference.

BACKGROUND OF THE INVENTION

1. Field of the Invention

The present invention relates to system, a method, an apparatus, a control method thereof, and a computer program for wireless communications under an environment wherein there are a plurality of terminals capable of wireless communications, and particularly to a system, a method, an apparatus, a control method thereof, and a computer program for wireless communications under an environment in which a plurality of users freely select wireless communications terminals of their respective choices and form respective independent wireless network groups.

More particularly, the present invention relates to a system, a method, an apparatus, a control method thereof, and a computer program for wireless communications in which each user forms a wireless network group over the wireless communications terminals by way of a simple authentication procedure.

2. Description of the Related Art

With the spread of information communications technology, sharing information such as a file and data or sharing peripheral equipment such as a printer, or exchanging information by electronic mail and data transfer are frequently carried out by connecting a plurality of computers to form a LAN (Local Area Network).

The conventional LAN is generally carried out by connecting with wire such as optical fiber, coaxial cable or twisted-pair cable. However, it requires cable laying work which makes it difficult to construct the LAN with ease. Further, even after construction of the LAN, the limitation of moving range of the equipment due to a cable length brings inconvenience.

Consequently, to free the user from LAN wiring due to the wire method, wireless LAN is now attracting attention. Since wireless LAN can dispense with much of wire cable, terminals can be moved with relative ease.

Along with spread of information apparatus and equipment such as a personal computer and computerization of home appliances, a wireless network is prevailed into a home very quickly. Under such PAN (Personal Area Network) environment, it is assumed for a condition that a plurality of wireless equipment exist in the home. In order to establish connection over each wireless equipment, a procedure called "authentication," is needed between the wireless equipment the user desires to connect to.

For example, in Japanese Patent Application Publication No. 2001-144767, there is disclosed a method of selecting the equipment to connect to a wireless LAN, which enables to select any desired connecting equipment among a plurality of connecting equipment exist in a communications range.

Nevertheless, very cumbersome procedures are needed if communications are to be made by selecting a desired communications equipment among a plurality of communications equipment in a communication range.

For example, there is already available a system which establishes one-to-one communications by performing authentication using a contactless card. However, in this case, authentication information is transmitted one-sidedly from the contactless card, and it is not suited for performing authentication in forming a many-to-many network.

SUMMARY OF THE INVENTION

The present invention purports to meet a need, especially, for providing a superior system, a method, an apparatus, a control method thereof, and a computer program for wireless communications, which enable a plurality of users to freely select wireless communications terminals of their choices and form respective independent wireless network groups under a wireless communications environment.

Further, the present invention addresses another need of a superior system, a method, an apparatus, a control method thereof, and a computer program for wireless communications, which enable each user to form an independent wireless network group between the wireless communications terminals by means of a simple authentication procedure.

The present invention has been rendered in consideration of the above-mentioned needs, and its first aspect is a wireless communications system for forming a wireless network group per user, under an environment in which a plurality of terminals capable of wireless communications exist, the system comprising:

each communications terminal capable of receiving a memory card detachably, receiving a certain user's memory card successively, reading ID information held therein to perform authentication; and each wireless communications terminal forming a wireless network group with a communication destination having the same ID information which is read from the memory card.

It should be pointed out, however, that the "system" mentioned herein refers to a logical aggregation of a plurality of equipment (or functional modules realizing a specific function), regardless of each equipment or functional module being housed in a single frame.

Also, a second aspect of the present invention is a wireless communications method for forming a wireless network group per user under an environment in which a plurality of terminals capable of wireless communications exist, each wireless communications terminal capable of receiving a memory card detachably, the method comprising the steps of:

authenticating whereby each wireless communications terminal receives successively a memory card of a certain user and reads ID information held therein; and constructing a network whereby each wireless communications terminal forms a wireless network group with the other end of communications having ID information equal to the one read from the memory card.

According to a wireless communications system or a wireless communications method of the first or the second aspect of the present invention, a complex authentication of wireless communications terminal can be performed by a simple procedure of inserting a memory card into the equipment. Consequently, the user can freely select any desired wireless communications terminal among a plurality of wireless communications terminals available in a communications range, and form a network group for his exclusive use, and carry out wireless communications.

According to a wireless communications system or a wireless communications method of the first or the second aspect of the present invention, for example, even while traveling or going out, the user can easily construct a PAN at a destination by means of a simple authentication procedures of inserting his memory card into desired equipment.

At this point, it should be noted that when receiving a memory card, each wireless communications terminal may write its own operating information in the memory card or read operating information written by other wireless communications terminals. As a result of such processing operation, in the wireless network group thus formed, each wireless communications terminal can share mutual operating information and carry out wireless communications according to the shared operating information.

Consequently, by writing operating information on each equipment in the memory card to be used, this type of information can be distributed through the operation of inserting the memory card, thus resulting in simplifying part of the operation of a wireless communications apparatus and enabling efficient data transmission to be accomplished.

Here, as operating information to be distributed, a data format that can be employed by the equipment, a media attribute, a transmission rate, a modulation method, frequency band to be used, and other data can be pointed out.

Further, each wireless communications terminal may further comprise a display unit indicating completion of authentication by receiving a memory card. By indicating for which user the authentication was performed, each user can make a visual confirmation thereof. Hence, even if an illegal user attempts to steal the equipment data wirelessly, an illegal act can be prevented before it happens by indicating the authenticated user with this display.

Still further, together with ID information, storage of visible user information in the memory card enables user information to be distributed by the authentication procedure. In such a case, each wireless communications terminal can show user information read from the memory card. Visible user information herein means a string describing a user name, image information showing a user face as well as an icon. By referring to such display, the user can easily tell visually which user was authenticated.

Moreover, a third aspect of the present invention is a wireless communications apparatus for forming a wireless network group per user and carrying out wireless communications under an environment in which a plurality of terminals capable of wireless communications exist, the apparatus comprising:

a wireless communications unit for transmitting and receiving wireless data; and a memory card interface receiving a memory card detachably, wherein:

authentication is performed by reading ID information from a memory card received by the memory card interface, and a wireless network group per user is formed with a communication destination in accordance with the ID information.

In addition, a fourth aspect of the present invention is a control method of a wireless communications apparatus, equipped with a memory card interface receiving a memory card detachably, for forming a wireless network group per user and carrying out wireless communications under an environment in which a plurality of terminals capable of wireless communications exist, the method comprising the steps of:

authenticating by receiving the memory card and reading ID information therefrom; and constructing a network for forming a wireless network group with the other end of communications in accordance with the ID information.

According to a wireless communications apparatus or its control method of the third or the fourth aspect of the present invention, authentication processing to form a wireless network group can be performed with a simple procedure of inserting a memory card into the equipment. Consequently, the user can freely select his desired wireless communications apparatus and incorporate it in the network group for his exclusive use in a communication range.

According to a wireless communications apparatus or its control method of the third or the fourth aspect of the present invention, for example, even while traveling or going out, the user can easily incorporate his desired wireless communications apparatus at a destination in a temporarily constructed PAN through a simple authentication procedure of inserting his memory card into a memory card slot.

At this point, when receiving a memory card, an arrangement may be made for a wireless communications apparatus to write its own operating information in the memory card or read operating information written by other wireless communications terminals. As a result of such processing operation, the wireless communications apparatus can share mutual operating information with other wireless communications apparatus in the wireless network group and carry out wireless communications according to the shared operating information. This leads to simplifying a part of the operation of the wireless communications equipment, enabling efficient data transmission to be made.

Now, as operating information to be distributed, the data format that can be employed by the equipment, the media attribute, the transmission rate, the modulation method, the frequency band to be used, and other data can be pointed out.

Also, a wireless communications apparatus may be further equipped with a display unit to show that authentication is completed by receiving a memory card. In this case, the wireless communications apparatus can visually notify to the user for which user the authentication was completed. Hence, even if an illegal user attempts to steal data wirelessly, by showing the authenticated user on this display, an illegal act can be prevented before it happens.

Further, by storing visible user information together with ID information in the memory card, a wireless communications apparatus can obtain user information via the memory card in the authentication procedure. Visible user information herein means a string describing a user name, image information showing a user face as well as an icon. Which user was authenticated can be easily identified as a wireless communications apparatus displays such visible user information.

Still further, a fifth aspect of the present invention is a computer program described to execute processing for forming a wireless network group per user by means of a wireless communications apparatus equipped with a memory card interface which receives a memory card detachably, under an environment in which a plurality of terminals capable of wireless communications exist, the program comprising the steps of:

authenticating by receiving a memory card and reading ID information therefrom; and constructing a network for forming a wireless network group with a communication destination in accordance with the ID information.

A computer program according to the fifth aspect of the present invention is that which defines a computer program described in a computer readable format to realize predetermined processing on the computer system. In other words, by installing a computer program of the fifth aspect of the present invention on the computer system, cooperative action is given the computer system, delivering the same effect as a wireless communications apparatus or its control method of the third or the fourth aspect of the present invention.

According to the present invention, there may be provided a superior system, a method, an apparatus, a control method thereof, and a computer program for wireless communications, which enable a plurality of users to freely select wireless communications terminals of their choices and form respective independent wireless network groups under a wireless communications environment.

In addition, the present invention provides a superior system, a method, an apparatus, a control method thereof, and a computer program for wireless communications, which enable each user to form a wireless network group by means of a simple authentication procedure over the wireless communications terminals.

In the present invention, complex authentication of wireless equipment can be performed by a simple procedures of inserting a memory card into the equipment. Consequently, the user can freely select desired wireless equipment among a plurality of wireless equipment exist in a communications range, and form a network group for his/her exclusive use, and then carry out wireless communications.

For example, even while traveling or going out, the user can easily construct a PAN at a destination through a simple authentication procedures of inserting his/her memory card into desired equipment.

Further, in performing the authentication procedure, by writing beforehand operating information concerning each equipment and the like in a memory card to be used, this type of information can be distributed by performing the operation of inserting the memory card. As a result, part of the operation of wireless communications equipment can be simplified, enabling data transmission to be carried out efficiently.

Still further, by providing display functions such as an LED indicator and a display panel to each wireless communications equipment so as to show for which user authentication was performed, each user can visually identify that information. Consequently, even if an illegal user attempts to steal equipment data wirelessly, it prevents an illegal act before it happens by indicating the authenticated user through this display.

For example, assuming halls at an academic conference, each room has a projector and each participant bringing his/her PC. Use of the present invention will enable the following application to be accomplished: Each participant inserts his/her memory card once into the projector of each room to register his/her authentication ID information therein, while, at the same time, by referring to information written in each projector, for example, it is possible to control so as not to use a frequency of another projector in an adjacent room, thereby avoiding interference.

Other objects, features and advantages of the present invention will become clear from more detailed description based on the preferred embodiments of the present invention to be explained later and the accompanying drawings.

BRIEF DESCRIPTION OF THE DRAWINGS

FIG. 1 shows a schematic diagram of a hardware configuration of a wireless communications apparatus 100 of a preferred embodiment according to the present invention;

FIG. 2 shows a schematic diagram of a state of a plurality of equipment 201 to 206 mounted with a wireless communications apparatus 100 which are scattered inside a wireless communications area constructed at home and the like;

DETAILED DESCRIPTION OF THE PREFERRED EMBODIMENTS

Figure 2:
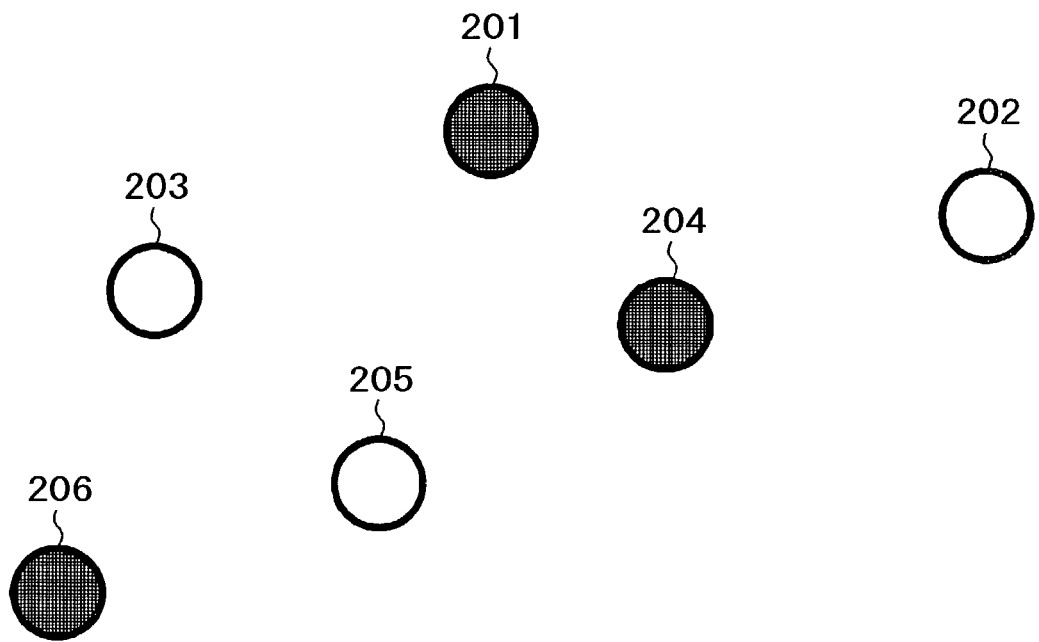

Preferred embodiments of the present invention will now be described in detail below with reference to the accompanying drawings.

In FIG. 1, hardware configuration of a wireless communications apparatus 100 of a preferred embodiment according to the present invention is schematically shown.

An antenna 101 serves both transmission and reception. A wireless communications unit 102 converts a signal received by the antenna 101 down to a base band signal, which is further subjected to A/D conversion and demodulation processing, and outputted as receiving data to a central controller 103. Also, the transmission data passed from the central controller 103 is subjected to modulation processing and D/A conversion to provide a base band signal, and after further converting it up to an RF frequency band, then the signal is released from the antenna 101.

The central controller 103 consists of, for example, a microprocessor, and by executing a predetermined program code under an execution environment provided by an operating system (OS), the central controller 103 totally controls the entire operation of the wireless communications apparatus 100.

A RAM (Random Access Memory) 104, which is a writable semiconductor memory device, is used by the central controller 103 for program loading and temporary storage of operating data. Also, a ROM (Read Only Memory) 107, which is a read-only semiconductor memory device storing data permanently, stores a control program and the like executed in the central controller 103, for example.

An LED indicator 108 is employed for visually showing the status of the wireless communications apparatus 100. In the present preferred embodiment, the LED indictor 108 is used to indicate clearly which user's authentication the wireless communications apparatus performed(to be explained later).

A memory card interface 105 is a device receiving a memory card 106 inserted thereto detachably, performing read and write operations of data for the memory card 106. In the present preferred embodiment, authentication processing of the wireless communications apparatus 100 is performed using the memory card. Details will be described later.

An external interface 109 is a device to connect the wireless communications apparatus 100 to external equipment. As the external equipment, there are, for example, information terminals such as a personal computer (PC) and a PDA (Personal Digital Assistant) and the equipment such as information home appliances. On these information terminals, application programs for certain use are executed. Further, these information terminals are provided with high-performance user interfaces including user input devices such as a keyboard and operating pushbuttons as well as liquid crystal displays.

The equipment mounted with the wireless communications apparatus 100 is provided, for example, in the same wireless communications area in a condition capable of communication. Referring to FIG. 2, there is schematically shown how a plurality of equipment 201 to 206 mounted with the wireless communications apparatus 100 are scattered around a wireless communications area constructed domestically, that is, in a house, for example.

As shown in FIG. 2, under a wireless communications environment wherein the plurality of equipment 202 to 206 capable of wireless communications exist, it is possible to For example, write an ID information indicating that the user is the father (or the mother) in the memory card via the memory card interface 105. By this means, a memory card having the user's own ID information can be created, and the initial setting is finished.

Figure 4:
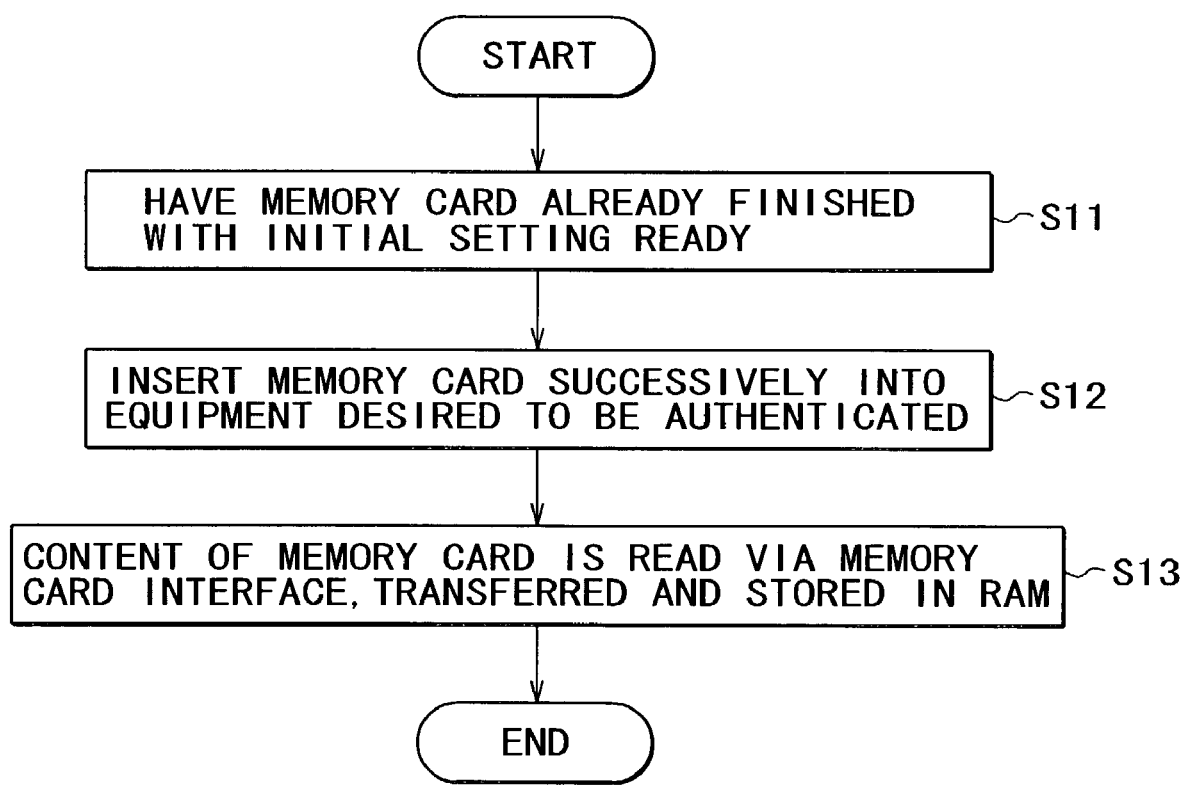
FIG. 4 shows a flow chart of a procedure for authentication processing of each equipment.

Also, referring to FIG. 4, there is shown a second step to construct a desired wireless communications network at home. The procedure of authentication processing of each equipment is shown in a flow chart. The processing procedure is realized in a form wherein the central controller 103 executes a predetermined program code in each wireless communications apparatus 100.

First, the user has his/her memory card ready which was already prepared by the above-mentioned operation (step S1), and inserts the card successively into a memory card slot of the equipment for which he desires his/her card to be authenticated (step S12).

Next, data stored in the inserted card is read via the memory card interface 105, that is, ID information is read, and transferred data to a nonvolatile RAM, and stored therein (step S13). For example, the ID information (for example, indicating being the father) is transferred via the memory card interface 105 to the RAM 104 so as to be stored therein.

Figure 5:
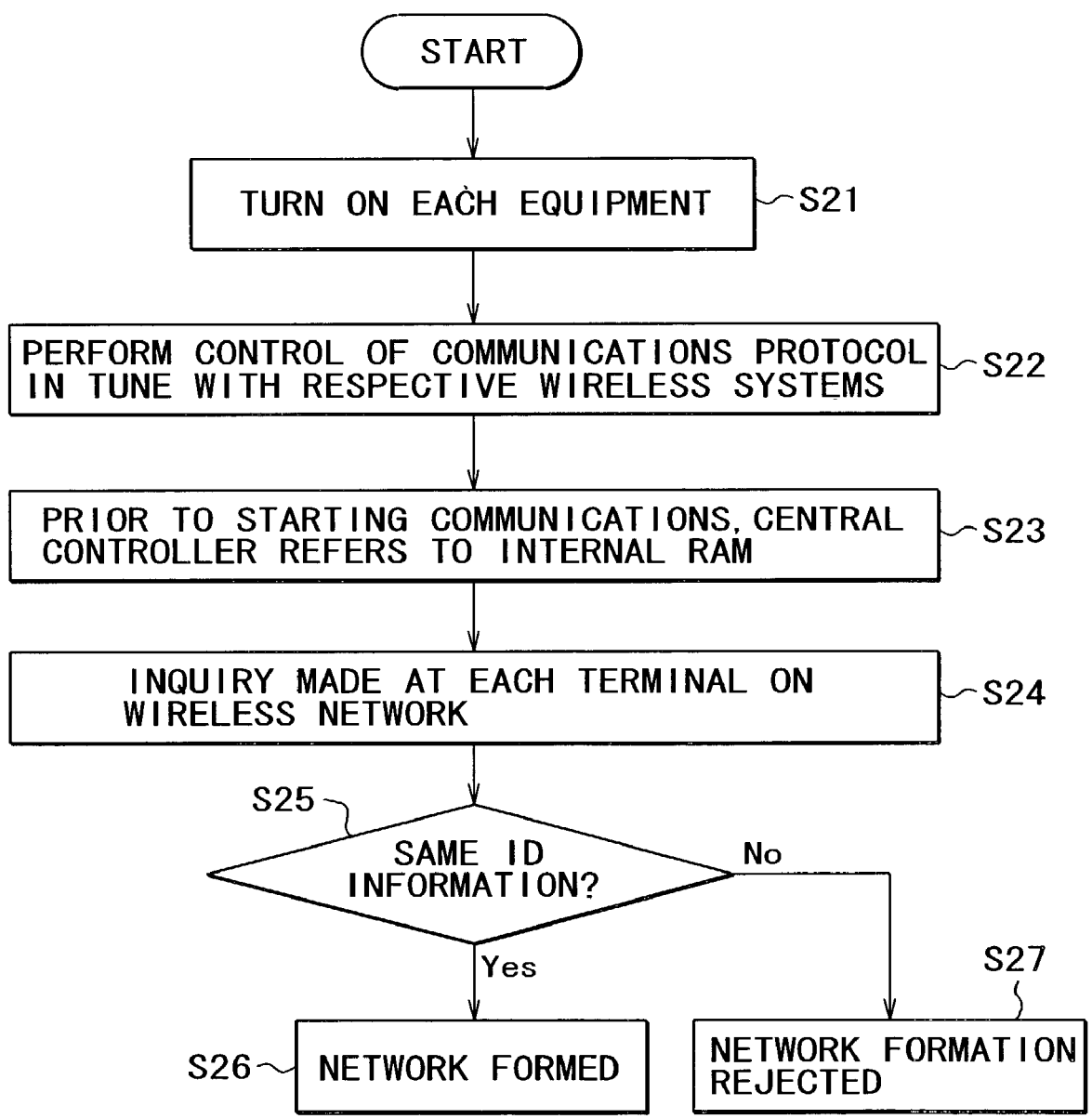
FIG. 5 shows a flow chart of a processing procedure for forming a wireless communications network comprised of each authenticated equipment.

Further, FIG. 5 shows a flow chart of a processing procedure for forming a wireless communications network comprised of each authenticated equipment. This is a third step for constructing a desired wireless communications network at home. The processing procedure is realized by the central controller 103 executing a predetermined program code in each wireless communications apparatus 100.

Now, the processing procedure for forming a wireless communications network will be described in detail below with reference to the flow chart.

First, each equipment which was already authenticated (step S21) is powered on, and a communications protocol for normal networking in line with the wireless communications apparatus 100 built in the equipment will be processed (step S22). Since the operation in step S22 can be realized in accordance with the normal communications protocol control, its description will be omitted.

In a general wireless network, networking of each equipment is supposed to be accomplished at this point. On the other hand, in the case of the present preferred embodiment, further, immediately before the central controller 103 starts communicating, it makes reference to the internal RAM 104 (step S23), then each terminal inquires mutually to confirm if the ID information written in the RAM 104 is the same between the equipment (step S24). This inquiry can be performed, for example, as the equipment on the transmitting end sends out a packet containing identification information (destination information) and ID information in a format such as broadcast to the equipment on the receiving end.

If the ID information held by pieces of equipment are identical (step S25), formation of a network among the pieces of equipment is permitted (step S26). Namely, once the equipment on the receiving end recognizes that the packet is addressed thereto and that the ID information is the same, receiving processing (that is, demodulation processing of the received data) is started. On the other hand, should the ID information be in disagreement, formation of a network is rejected (step S27).

As a result of executing processing shown in FIG. 5, it is possible to form a wireless network group between the wireless communications equipment having the same ID information which is read by the memory card under the wireless communications environment.

In a case where a memory card is inserted by two or more users into a piece of wireless communications equipment, this wireless communications equipment can obtain two or more ID information. In this event, one wireless communications equipment may be arranged to belong simultaneously to two or more wireless network groups.

Figure 3:
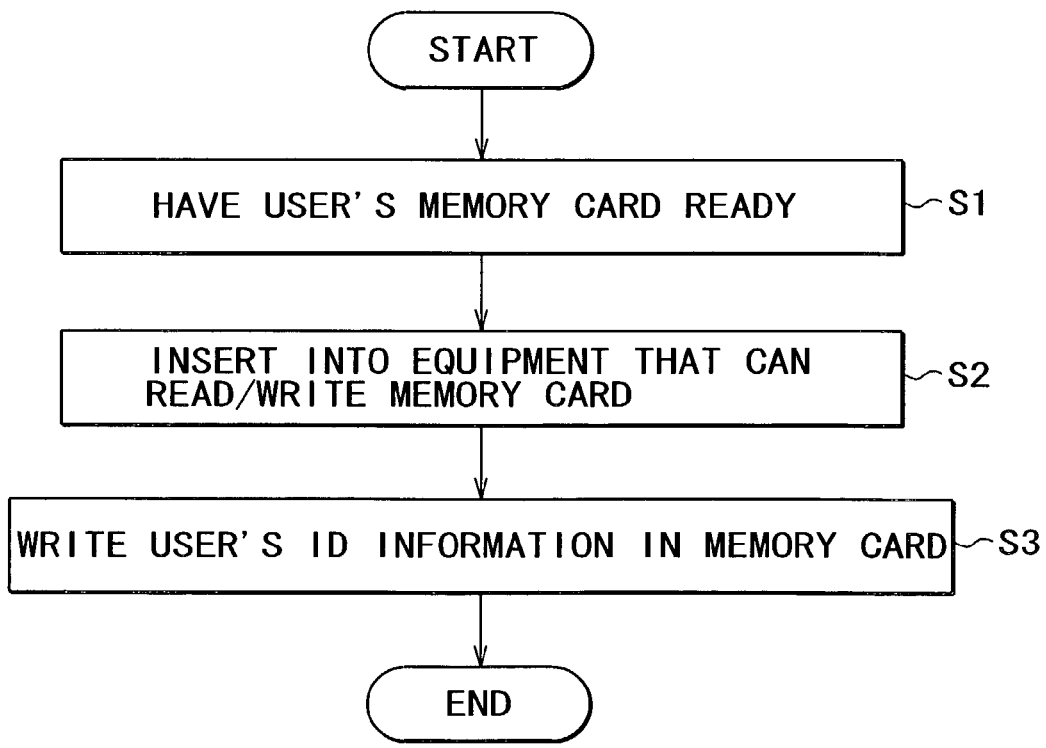
FIG. 3 shows a flow chart of a processing procedure for initial setting operation to perform authentication in a home wireless network by using a memory card as an authentication medium.
Figure 6:
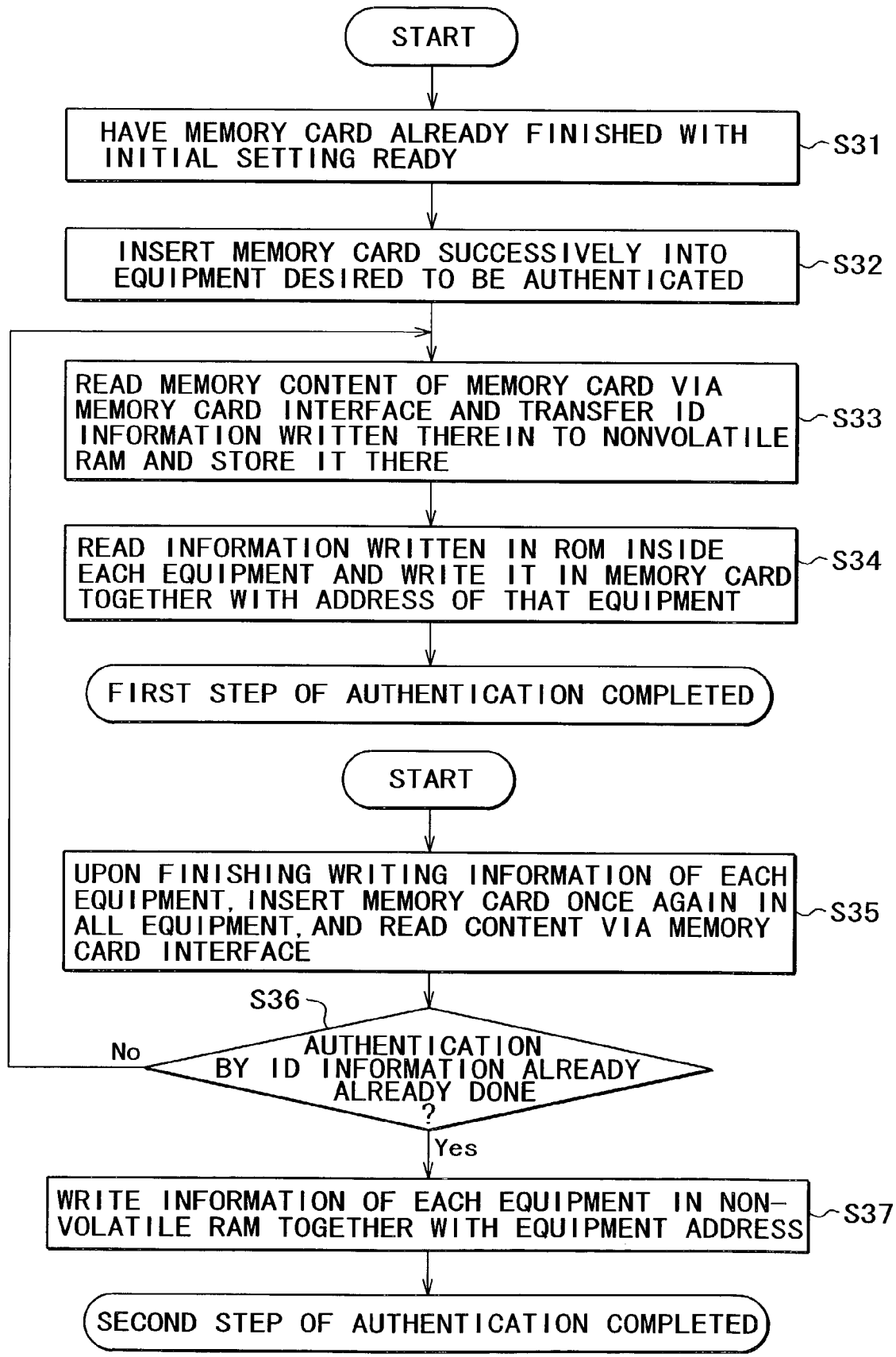
FIG. 6 shows a flowchart of an application example of a processing procedure corresponding to a second step of authentication for forming a wireless communications network by the wireless communications apparatus 100 of a preferred embodiment according to the present invention.

In FIG. 6, there is shown an application example of a processing procedure to form a wireless communications network by means of the wireless communications apparatus 100 according to the present preferred embodiment. It should be noted, however, that in this example, the initial setting operation of a memory card which is the first step shown in FIG. 3 is supposed to be already completed. The processing procedure is realized in terms of execution of a predetermined mutually authenticate the user very simply and surely by using the memory card as a medium.

Further, when a data-writable/readable memory card is employed as an authentication medium, information from each equipment (for example, operating information of the equipment) can also be written on the memory card, so that efficient transmission can be made by knowing the equipment information in advance prior to transmission. Still further, not only networking the equipment purchased by the user, there is a feature of easily building a network out of a TV or a camcorder even at a hotel of a travel destination.

In the present preferred embodiment, construction of a home wireless communications network desired by the user is undertaken in a three-step procedure wherein after the "initial setting" and "authentication work" are carried out, "operation" is performed.

In using a wireless communications network according to the present preferred embodiment, the user is required to carry out an "initial setting operation" to make a memory card of each user. FIG. 3 shows a flow chart of a processing procedure for the initial setting operation to carry out authentication in a domestic wireless network using a memory card in this manner for an authentication medium.

First, the user prepares his/her memory card (step S1). Then, insert the memory card into a piece of equipment capable of reading and writing the memory card (step S2) and write his/her own ID information on this card (step S3). program code by the central controller 103 in each wireless communications apparatus 100.

Now, the processing procedure for forming a wireless communications network will be described in detail below with reference to this flow chart.

First, the user has his/her memory card ready, initial setting of which was already completed (step S31), inserts the card into all the equipment desired to be subjected to networking (step S32), and writes an ID information in the internal nonvolatile RAM (step S33). Part of the procedure up to this point is the same as the processing procedure explained with reference to FIG. 4.

After finishing the ID information write operation, the next step is reading information if there is information stored in the ROM 107 inside each equipment and wiring it in the memory card together with an address thereof (step S34).

As information stored in the ROM 107, operating information regarding the equipment and the like can be included. For example, suppose the information is written at the time of factory shipment. In the present processing procedure, data information is stored in the ROM 107. For example, information which regulates equipment operation on the network such as a DVD player transmitting only data in MPEG 2 format and the like is written. Naturally, there may be not only data format information but also, for example, data rate information. In regard to the data rate, there may be stored information in a format describing that the equipment has a fallback capability or a maximum transmission rate of 24 Mbps, for example.

When such information stored in the ROM 107 is written into the memory card, the first step of authentication is completed.

After the first step of authentication in each equipment is finished, the second step of authentication is next executed.

Once again, insert the memory card into all the equipment to be subjected to networking, and information in the card is read (step S35). At this instant, it is checked whether or not authentication by the ID information was carried out in the first step (step S36).

Ascertaining whether or not the ID information is authenticated is carried out by referring to the content stored in the RAM of each equipment. If not authenticated, the processing returns to step S33 which is included in the first step of authentication. On the other hand, if already authenticated, the processing proceeds to the following step S37, wherein an address of each equipment and other information (for example, data format information) stored in the memory card are all written in the nonvolatile RAM in each equipment.

Following the processing procedure such as step S35 to S37 makes it possible for each equipment constituting a network to distribute information stored in each ROM to all equipment through a medium of the memory card and share such information. For example, in a case where information regarding the operation between the equipment forming a network is stored in the ROM of the other equipment, it is written through the medium of the memory card in the RAM of the other equipment. As a result, part of the operation of a piece of wireless communications equipment can be simplified, enabling efficient data transmission to be carried out.

As an example, information that DVD data of address No. 1 is in MPEG2 format and that TV of address No. 2 is not limited in receiving data format and can cope with a variety of data formats is written. This completes the second step.

In an application example shown in FIG. 6, when subjecting each wireless communications apparatus 100 to authentication processing by means of a memory card, by writing operating information in each apparatus 100 in the memory card, it is possible to share the same operating information within the wireless network group through the medium of a memory card. The operating information may include the data format that can be employed by the equipment, the media attribute, the transmission rate, the modulation method and the like.

Once the equipment is determined, the data format to be used is instantly determined such as MPEG2 for DVD, DV format for camcorder, MPEG-HD for BS digital tuner. If arranging this data format information available beforehand through the medium of a memory card, for example, in a case of transmitting a DVD image to a TV, the TV side can determine that communications are in MPEG2 data format at the time of the TV finds out that the other end of communications is a DVD. Namely, there is no need of identifying at an upper layer, and the communicating operation can start instantly.

Further, it can be arranged so that a notice that data to be transferred by the equipment is image or sound can be given in advance through the medium of a memory card. When the other end of communications is the equipment such as a mini audio system, CD, and MD which transmits nothing but voice, knowing in advance that the transmission will be image transmission or voice transmission can simplify communications control.

Still further, it is possible to notify in advance a transmission rate with the equipment through the medium of a memory card. The maximum transmission rate is set per equipment such that DV has a rate of 32 Mbps or DVD has a rate of 8 Mbps. Knowledge of this communicable transmission rate in advance will set both parties to communicate at a lower rate in a case of communicating at an equal rate.

Furthermore, it is possible to notify in advance a modulation method to be used in communications through a memory card as the medium. In many cases, the modulation method is set for each equipment. In multi-level modulation (64QAM, 32QAM and the like), there is a large amount that can be transmitted, while in BPSK (Bi-Phase Shift Keying) and QPSK (Quadrature Phase Shift Keying), there is a small amount to be transmitted. For example, in a case of communications by the equipment capable of transmitting only in 16QAM and BPSK, prior to the start of communications, it can be anticipated that communications can be mutually carried out only through BPSK.

Moreover, a difference in network can be notified in advance through a memory card as the medium. For example, when connecting video CD to TV, the father may output only music from a PC to a TV speaker in a living room, whereas the daughter makes a setting to output music while running a demonstration video. In this instance, only music is transmitted from the beginning in a wireless network group formed by the father, and the daughter's wireless network group transmits an image and music.

Figure 7:
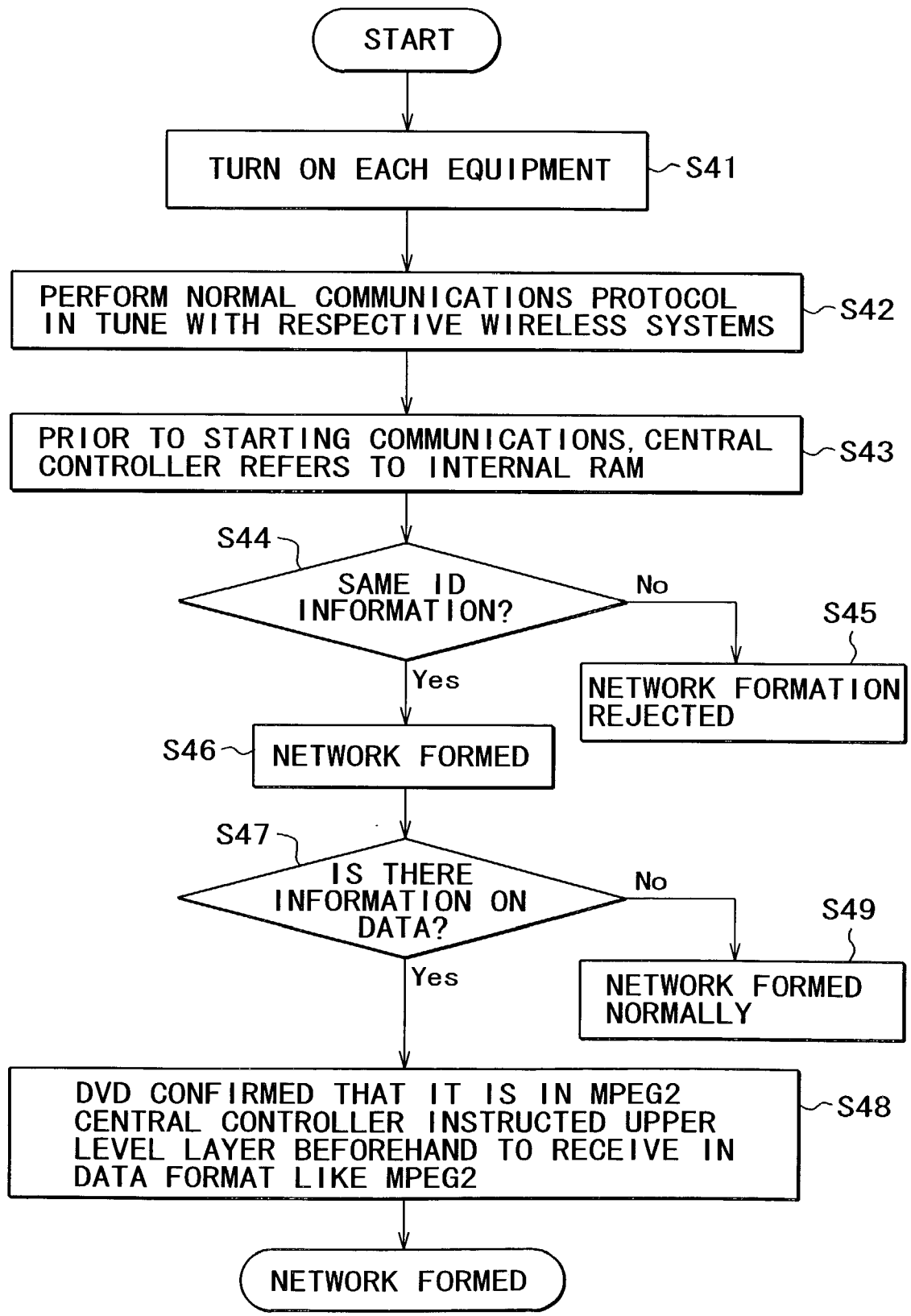
FIG. 7 shows a flowchart of an application example of a processing procedure corresponding to a third step of authentication for forming a wireless communications network by the wireless communications apparatus 100 of a preferred embodiment according to the present invention.

Also, FIG. 7 shows in flow chart an application example of a processing procedure corresponding to the third step of authentication for forming a wireless communications network by a wireless communications apparatus according to the present preferred embodiment. The processing procedure is realized by the central controller 103 executing a predetermined program code. Now the authentication processing procedure will be described in detail below with reference to the flow chart.

First, each equipment is powered on (step S41). Since a wireless communications apparatus 100 as shown in FIG. 1 is mounted on each equipment, first of all, perform control of normal communications protocol in line with respective wireless systems, then perform control to form a network according to the present preferred embodiment (step S42).

Immediately prior to starting communications, the central controller 103 refers to the internal RAM (step S43) and identifies whether or not the equipment on the other end has the same ID information (step S44).

If the equipment on the other end has the same ID information, proceed to step S46. In case of a different ID information, reject formation of a network and terminate all the present processing routine (step S45).

In step S46, a network is formed. At this instant, check to see whether or not information on data and information on operation concerning the networked equipment are held via the memory card (step S47).

In a case where no information concerning over the equipment is set, a network is formed in a normal manner (step S49), and communications are established while ascertaining the data format and the transmission rate during mutual communications. On the other hand, if DVD and TV information is in the RAM, proceed to step S48.

For example, when a command "display a DVD image on TV" arrives from the user, the central controller 103 first checks to see the content of the nonvolatile RAM and makes sure if there is information concerning DVD and TV.

In this example, there is provided a case of a data format regarding DVD and TV, wherein data from DVD is known beforehand to be in MPEG2. The normal processing procedure would consist of steps wherein the upper level program searches for a mutual data format while communicating, determines after reading the transmitted communications data, and packs data in line with the format. On the other hand, if there is foreknowledge of what kind of data will be transmitted, having this information in advance will make it possible to cut down the control and the time expended for control. Likewise, for example, in a case of a piece of communications equipment supporting only a low transmission rate, all that is required is for a receiving apparatus to wait for transmission at that transmission rate, thus reliefing the communications apparatus from cumbersome operations such as a fallback control in which the transmission rate is appropriately adjusted according to propagation environment. Namely, steps for network transfer are dispensed with, thereby enabling highly efficient communications to be carried out.

By being equipped with the LED indicator 108, the wireless communications apparatus 100 is able to display visually which network can be used for the equipment (as mentioned above). Through such LED display, it is possible to prevent wire tapping by authenticating the equipment in an unauthorized manner.

Figure 8:
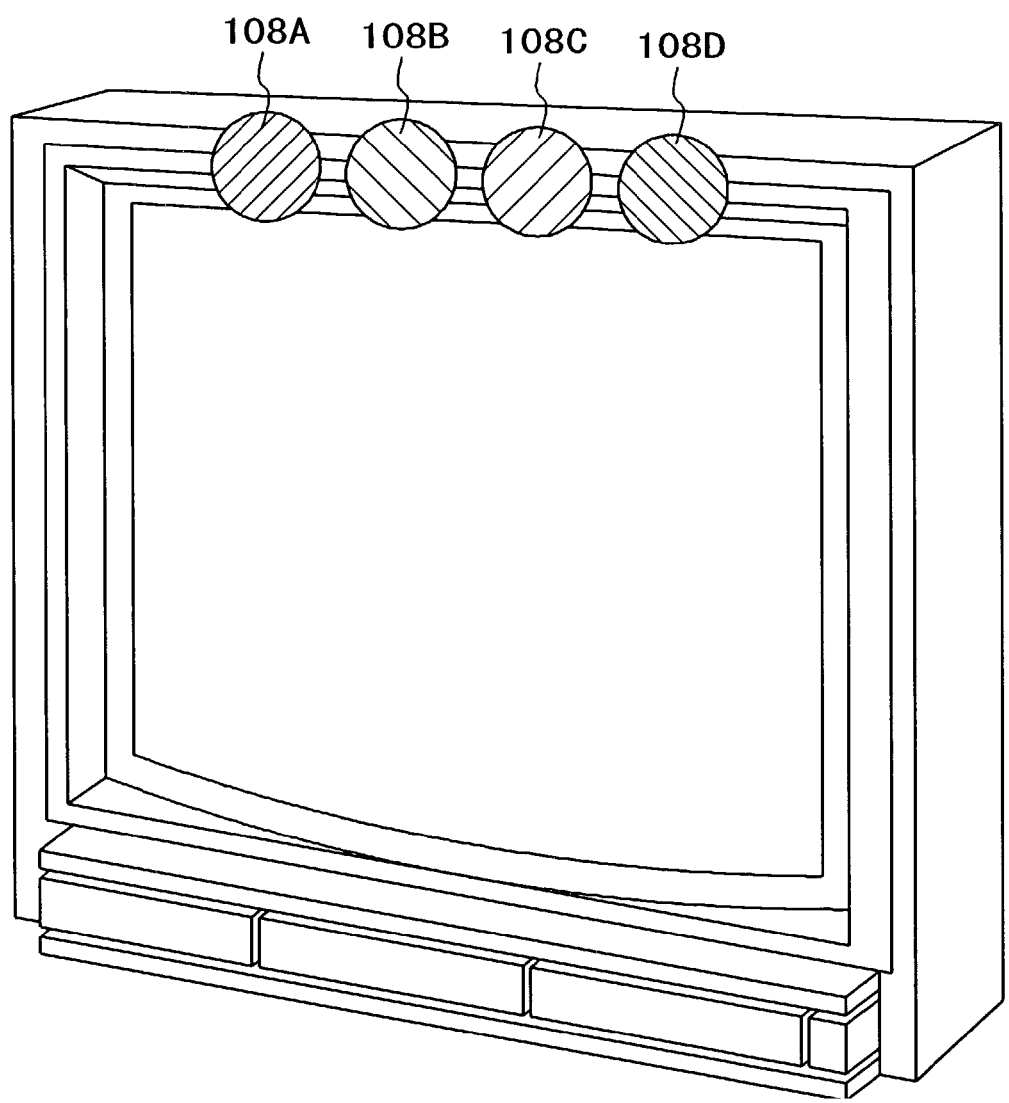
FIG. 8 shows a diagram of an external construction of a TV receiver as an example of equipment mounted with a wireless communications apparatus 100.

FIG. 8 shows an external view of construction of a TV receiver (hereinafter to be simply referred to as TV) as an example of equipment mounted with a wireless communications apparatus. As the same view shows, four pieces of LED indicators 108A to 108D are embedded along the upper edge of the picture frame at the front face of the TV. In the present embodiment, for example, the indicator 108A is red, the indicator 108B is yellow and indicator 108C is blue. This TV is, for example, set in the living room at a home.

When a wireless network is constructed inside a home, for example, there may be a case of a family of three people consisting of a father, a mother, and a daughter, each having a memory card with his or her own ID information written therein.

For example, the father can form his own network within a home wireless network by inserting his memory card into a TV in the living room, a PC and a videotape recorder in the study room.

Likewise, the mother can form her own network by inserting her memory card into a TV in the living room and a CD player on a washstand. Further, the daughter can form her own network by inserting her memory card into her radio-cassette recorder and a TV in the bathroom.

The TV in the living room as shown in FIG. 8 can be arranged that only the father and the mother can use through the authentication procedure employing an operation of inserting the memory card. Assume that of the LED indicators 108A to 108D placed on the front of the TV, the red LED indicator 108A is assigned to the father, the yellow LED indicator 108B is assigned to the mother, and the blue LED indicator 108C is assigned to the daughter.

In this case, among the LED indicators on TV, only the red LED 108A and the yellow LED 108B are on, showing that the father and the mother are in the usable status in the network. Further, because the blue LED 108C is off, it is apparent that the TV is not part of the daughter's network. Consequently, it is impossible for anybody wirelessly to eavesdrop to the radio-cassette recorder in the daughter's room. Even if authentication is rendered by someone in an unauthorized manner, a look at the LED indicator of the radio-cassette recorder can tell who has formed the network for one's own convenience, thus preventing any dishonest eavesdropping.

Further, in addition to identification through the color of emitted light of the LED indicator, there may be included a method such as displaying letters like "Father," "Mother," or "Guest" written on the ID information on the liquid crystal screen or another method like visually identifying by using icons and characters. Information on the color of emitted light of the LED indicator may be provided beforehand in matching color to the ID information at the time of initial authentication.

Still further, deletion of one's own authentication ID information from the network can be made while inserting the memory card, thus preventing impersonation. In this case, after inserting the memory card, the applicable ID information may be deleted from the nonvolatile RAM in the equipment by pressing a deletion button placed on the equipment. With the provision of such ID information deletion function, for example, it is possible to authenticate as a Guest for a TV in a hotel room during a trip, thereby easily forming a network with equipment brought by him/her, and when checking out, all that he has to do is to delete his/her ID information. In this manner, a network can be formed simply and safely.

Suppose an academic conference, for example. There is a projector in each meeting room and each participant brings his/her PC. Use of a wireless communications network in the meeting room according to the present preferred embodiment will make it possible for each participant to form a private network including a projector in the room, his/her own PC, and other necessary equipment by applying a memory card containing his/her ID information.

In this case, while each participant inserts his/her memory card once into the projector of each room and registers his/her authentication ID information in the projector, he can refer to information stored inside each projector. By doing so, for example, it is possible to control not to use the same frequency of the projector in the adjacent room.

Several specific examples applying a wireless communications network according to the present invention will be described below.

SPECIFIC EXAMPLE 1

Figure 9:
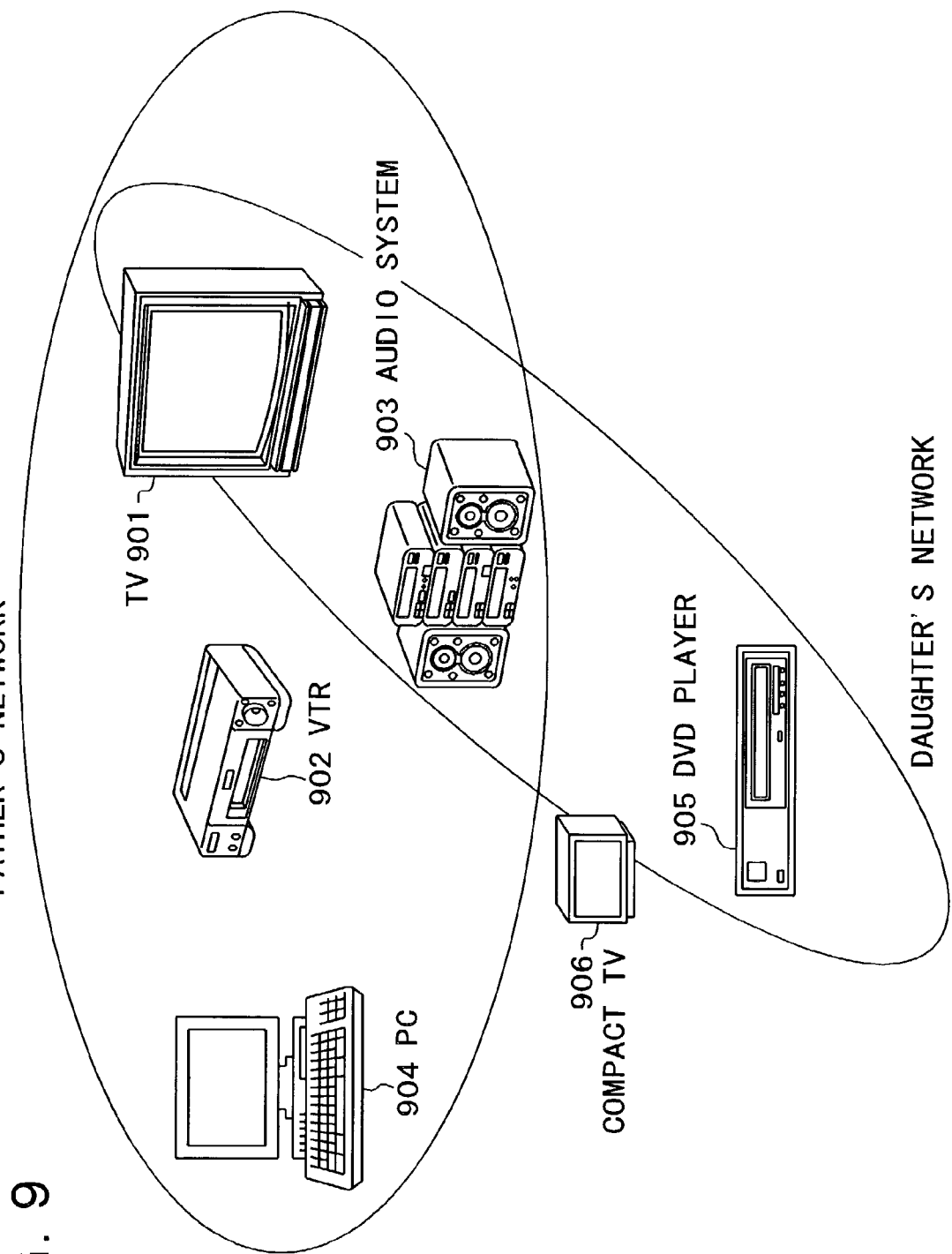
FIG. 9 shows a schematic diagram of a wireless communications environment inside a home to describe Specific Example 1.

Suppose there is a home wireless communications environment as shown in FIG. 9: a TV receiver 901, a videotape recorder (VTR) 902, and an audio system 903 are placed in the living room; also, a personal computer (PC) 904 is placed in the study room; and a DVD player 905 as well as a compact TV 906 is placed in the daughter's room. Each of the equipment 901 to 906 is mounted with a wireless communications apparatus 100 having a memory card read/write function as shown in FIG. 1.

Here, assuming that the father is thinking of forming his private network comprised of the TV 901, the VTR 902, and the audio system 903 in the living room as well as the PC 904 in the study room. And, the daughter is thinking of forming her private network comprised of the TV 901 and the audio system 903 in the living room as well as the DVD player 905 and the compact TV 906 in her room.

The father and the daughter carry out initial settings of each memory cards containing their respective ID information, while at the same time, characters of father and daughter are registered as user information in the memory cards. This character can be registered by writing in the memory cards at the time of initial setting operation. A character herein means image information such as an icon, a thumbnail, or other formats for recognizing visually each user like the father and the daughter. Naturally, if the equipment cannot display image information, letter information such as the father's and the daughter's names may be substituted as the user information.

Figure 10:
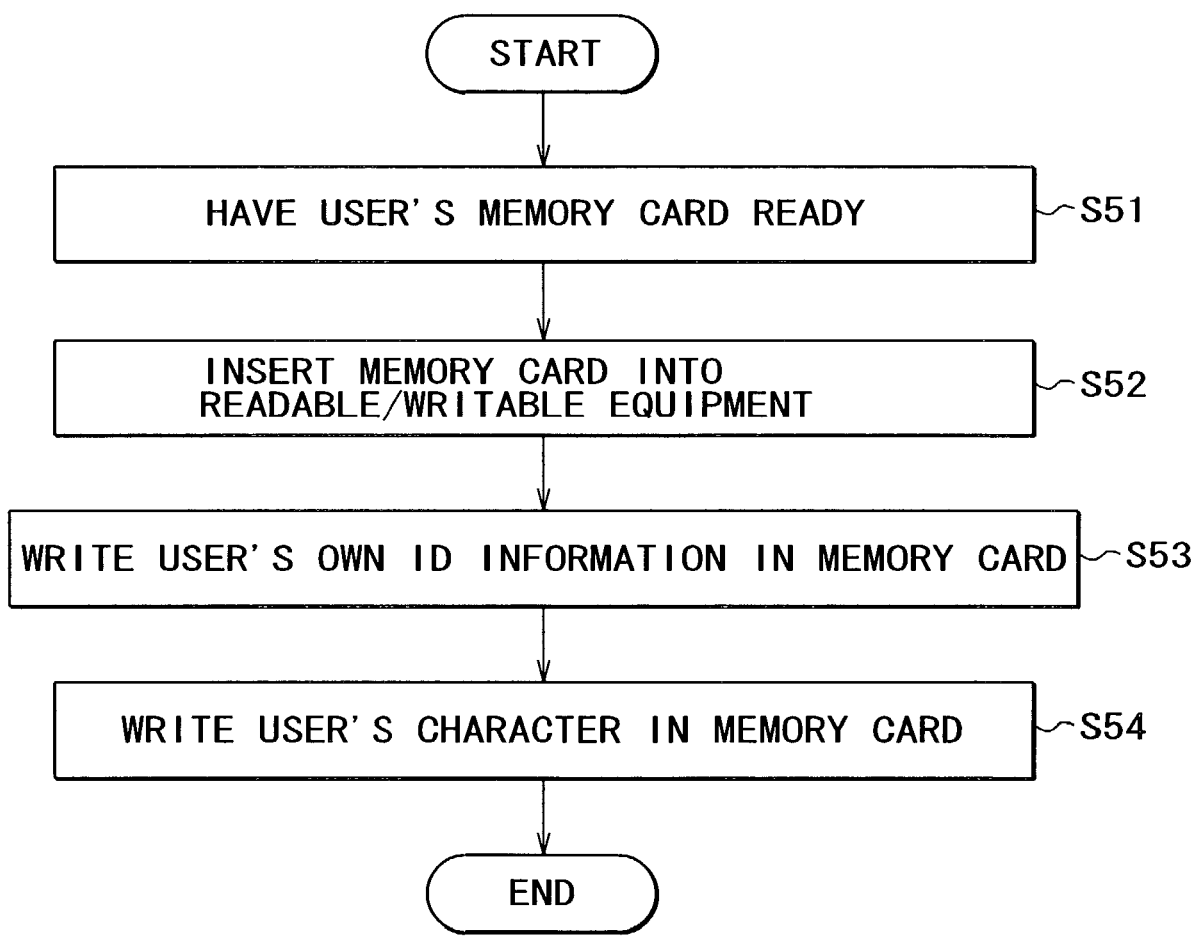
FIG. 10 shows a flowchart of a procedure for initial setting operation of a memory card in the Specific Example 1.

FIG. 10 shows a flow chart of the first step of authentication processing in this case, that is, the processing procedure of initial setting operation of a memory card.

Now, the user has his/her memory card ready (step S51). Next, insert the card into an apparatus that can read and write a memory card (step S52) and write his/her personal ID information in this card (step S53). For example, write an ID information showing that the user is the father (or the daughter) in the memory card via the memory card interface 105.

Further, user information such as his character is written in the memory card via the memory card interface 105 (step S54). A character herein means image information such as an icon, a thumbnail, or other formats for recognizing visually each user like the father and the daughter. Naturally, if the equipment cannot display image information, letter information such as the father's and the daughter's names may be substituted as the user information.

By this means, a memory card having one's own ID information can be prepared and the initial setting is finished.

Figure 11:
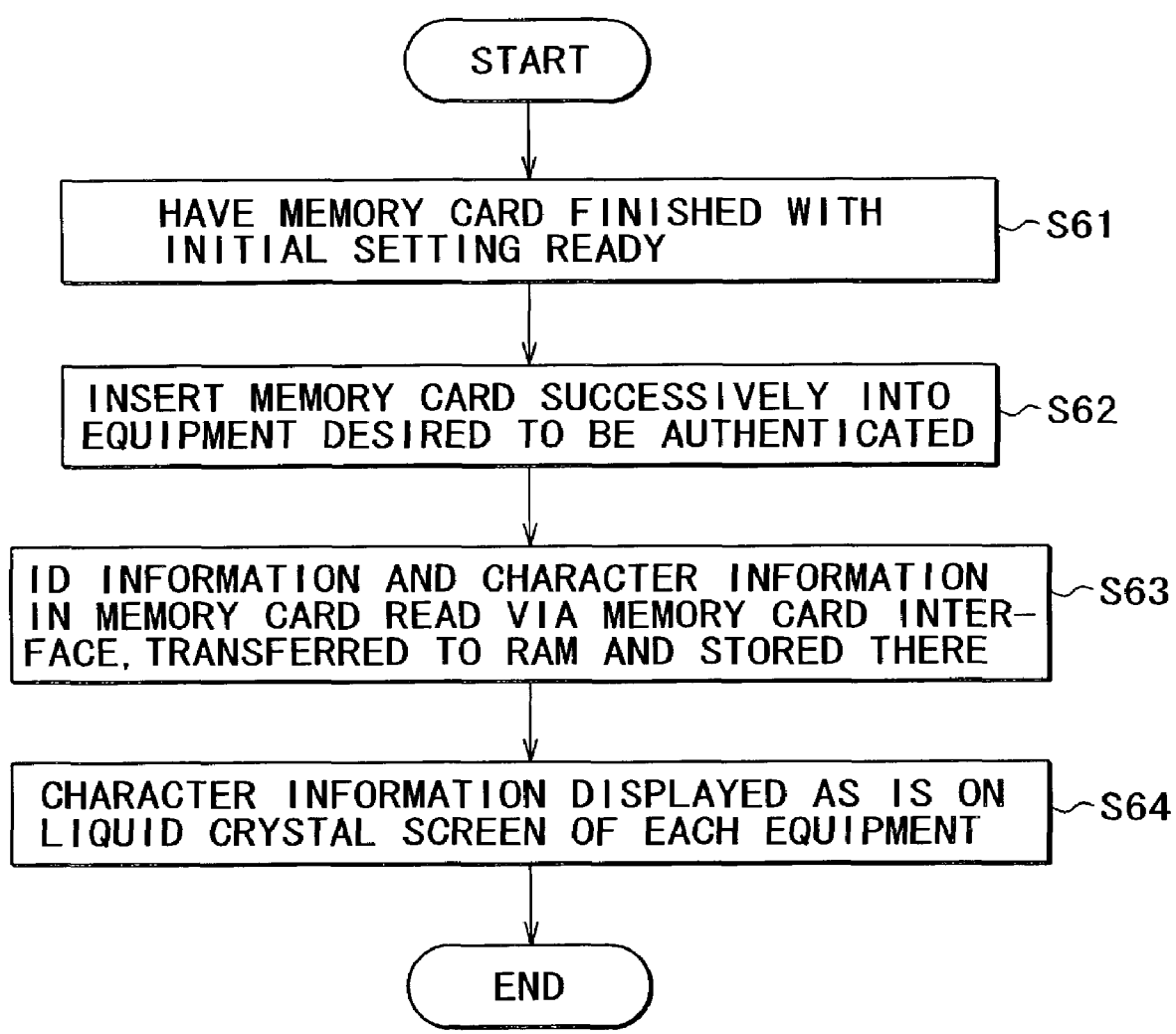
FIG. 11 shows a flow chart of a processing procedure for carrying out the second step of authentication processing of each equipment by using a memory card containing ID information and character information.

Still further, referring to FIG. 11, there is shown in a flow chart a processing procedure to perform a second step of authentication processing for each equipment by using a memory card containing ID information and character information in accordance with the processing procedure shown in FIG. 10. In this instance, by displaying user information such as a character on a liquid crystal screen of each equipment, the use can show authentication to other user. The processing procedure can be realized by the central controller 103 executing a predetermined program code in each wireless communications apparatus 100.

Now, the user has his/her memory card already prepared in the above-mentioned operation ready (step S61), and inserts the card successively into the memory card slot of the equipment, for which authentication is desired (step S62). In the memory card, in addition to ID information, visible user information such as user's character is written beforehand.

Next, data memorized in the inserted card is read via the memory card interface 105, that is, ID information is read, transferred to the nonvolatile RAM 104, and stored therein (step S63).

In addition, together with ID information stored in the memory card (for example, indicating the father), visible user information such as a character is read, transferred to the RAM 104 via the memory card interface 105, and stored therein.

On the end of the equipment into which the memory card is inserted, visible user information such as a character is displayed as it stands on the liquid crystal screen (step S64). By this means, each user can easily identify visually whose network the equipment belongs to. Hence, even if an illegal user attempts to steal data wirelessly, by showing the authenticated user with this display, an illegal act can be prevented before it happens.

Figure 12:
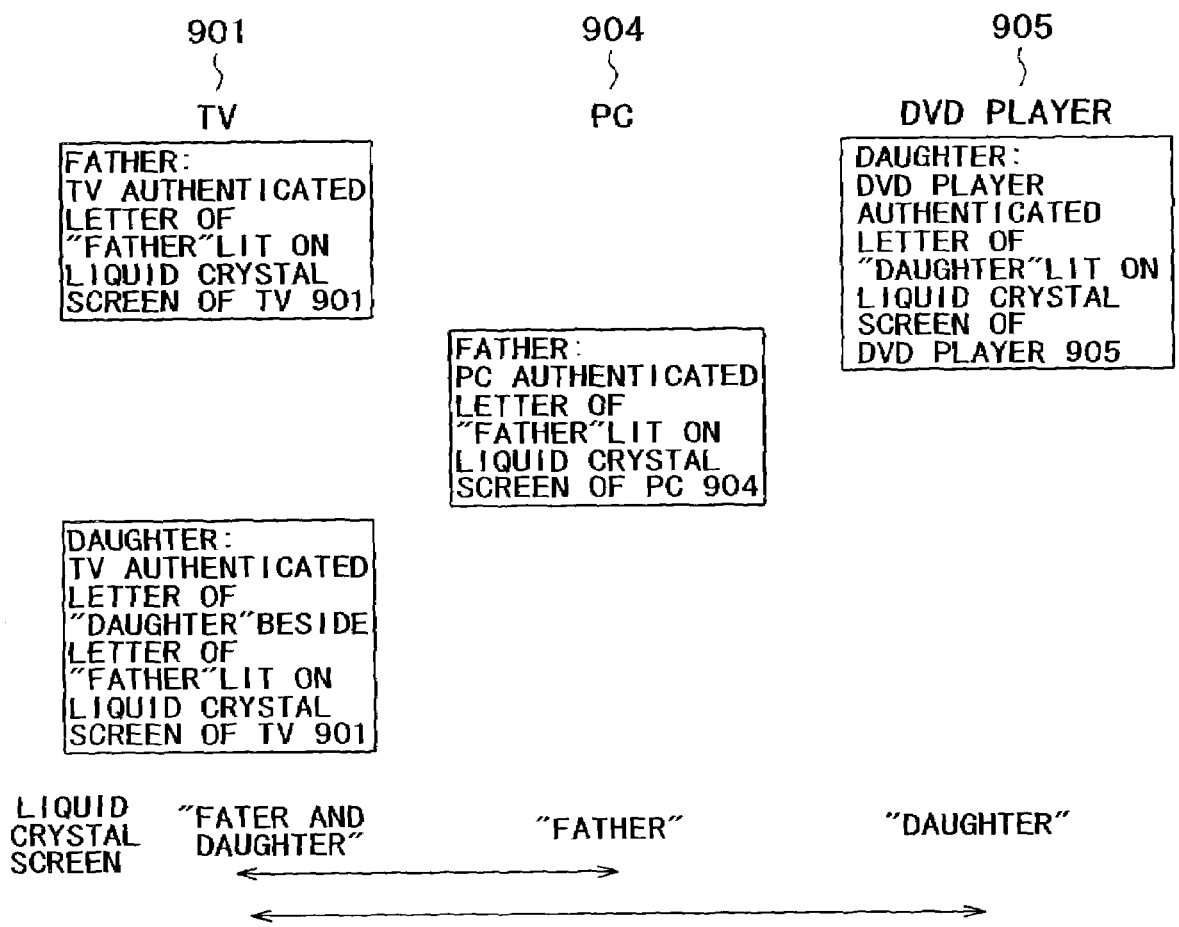
FIG. 12 shows a diagram illustrating an authentication status in the Specific Example 1.

In FIG. 12, there is shown an example of authentication status regarding the TV 901 in the living room, the PC 904 in the study, and the DVD player 905 in the daughter's room.

When the father performs authentication by inserting the memory card into the TV 901, the letter "father" lights up on the liquid crystal screen attached to the TV. Likewise, by performing authentication, the letter "father" remains on the liquid crystal screen of the PC 904.

The daughter performs authentication of the DVD player 905 and the TV 901. Since the TV 901 has already been authenticated by the father and the daughter, the letters of both the "father" and the "daughter" light up on the liquid crystal screen thereof as the user information which has been authenticated. By this means, the user can identify visually that the TV 901 in the living room can belong to both the father's and the daughter's networks.

The TV 901 belongs to both private networks of the father's and the daughter's. However, simultaneous communications cannot be accomplished, for example, when the father transmits an image from the PC 904 to the TV 901 and, at the same time, the daughter also attempts to send an image from the DVD player 905 to the TV 901. In this case, action may be taken by setting up priority order for the wireless system as a whole.

In the above-mentioned example, an arrangement is made to show information on all authenticated users on the liquid crystal screen of each equipment. Nevertheless, only information on those users currently engaged in communications among the authenticated users may be shown. Or, there may be another arrangement whereby, showing a list of information on all authenticated users, only information on those users currently engaged in communications is further shown in highlight display or reverse display to enable the operating status to be visually identifiable.

SPECIFIC EXAMPLE 2

Here, on the situation in traveling, a preferred embodiment wherein authentication of one's PDA and a TV set up in a hotel room at a destination is performed will be specifically described.

For authentication processing, the user inserts his/her memory card into both his/her PDA and the TV of the room. However, since initial setting operation of his/her memory card can be performed according to the processing procedures shown from FIG. 10 to FIG. 11, description thereof is hereby omitted.

Visible user information such as character or other different format set by the user appears on the liquid crystal screen of the TV in the room, whereafter communications are carried out by the normal operating control. When leaving the room, the user either deletes his/her own ID information from the TV; or, there may be adapted a system whereby the ID information and character information are deleted on a daily basis in case of a TV in a hotel.

SPECIFIC EXAMPLE 3

In a meeting, for example, at an academic conference, there is a wireless projector set in each room. On the occasion of setting the radio frequencies of projectors, in the vicinity such as adjacent rooms are written in the RAM of the projector in the meeting room beforehand.

To carry out communications with the projector, the user performs authentication through insertion of his/her memory card into the projector in the above-mentioned manner. In this instant, the radio frequency of a projector in the vicinity is read from the RAM of the projector, whereas it is possible to prevent interference with other rooms or wireless data by controlling no to use the same frequency for his/her PC's wireless system.

Figure 13:
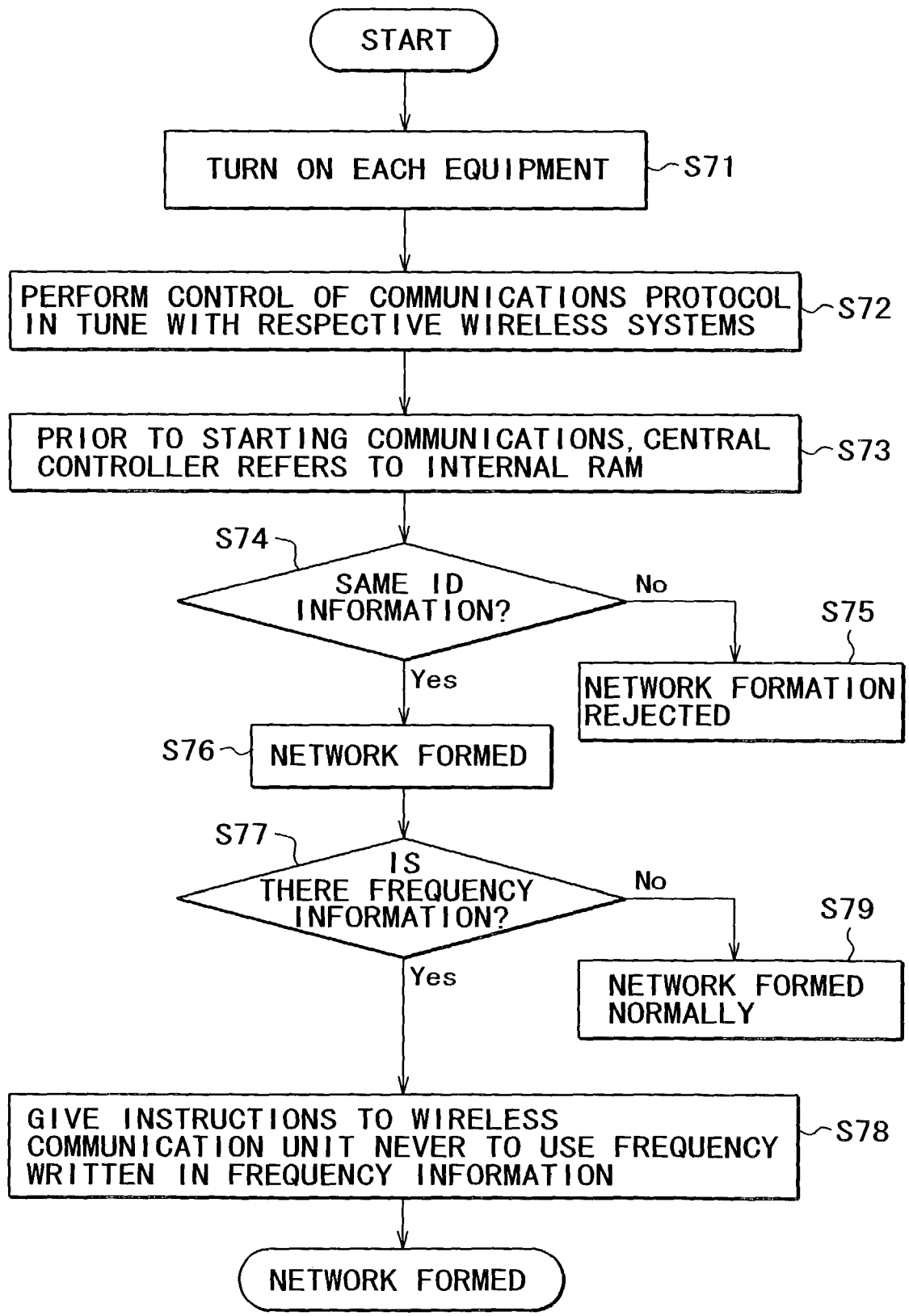
FIG. 13 is a flow chart of a processing procedure for forming a network so as to prevent interference with other wireless systems.

In FIG. 13, there is shown in a flow chart a processing procedure of forming a wireless network so as to prevent interference with other wireless systems. However, in regard to authentication, it is the same as the processing procedure shown in FIG. 6, and information read from the RAM of the equipment is the information on the radio frequency used by the projector in the vicinity. This processing procedure is realized in a form wherein the central controller 103 executes a predetermined program code in each wireless communications apparatus 100.

First, each equipment is powered on (step S71). Since a wireless communications apparatus 100 as shown in FIG. 1 is mounted on each equipment, first of all, normal communications protocol in line with respective wireless systems is controlled, then control to form a network according to the present preferred embodiment is performed(step S72).

Immediately prior to starting communications, the central controller 103 refers to the internal RAM (step S73) and identifies whether or not the equipment on the other end has the same ID information (step S74).

If the equipment on the other end has the same ID information, the process goes to step S76. In a case of a different ID information, formation of a network is rejected and all the present processing routine is terminated (step S75).

In step S76, a network is formed. At this instant, whether or not frequency information on the radio frequency used by other projectors is held via the memory card is checked (step S77).

If no information on the radio frequency used by the other projectors is available, a network is formed in a normal manner (step S79), and communications are established while ascertaining the data format and the transmission rate during mutual communications. On the other hand, if frequency information on the radio frequency used by the other projectors is stored in the RAM, the process goes to step S78.

In step S78, the central controller 103 gives instructions to the wireless communications unit 102 that the frequency described in this frequency information should never be used.

According to the processing procedure shown in FIG. 13, when using a wireless apparatus in the meeting room, the same frequency used in the adjacent room will never be used, thus avoiding interference with each projector and reducing a possibility of leaking information to other meeting rooms.

Addenda

While the present invention has been particularly shown and described in detail with reference to specific preferred embodiments thereof, obviously modifications, changes, and variations are possible by those skilled in the art without departing from the spirit and scope of the present invention. Namely, the present invention has been disclosed through examples, whereupon the content of the present invention should not be construed in a limited sense. For proper understanding of the essential points of the present invention, the attached claims should be taken into consideration.

What is claimed is:

1. A wireless communications system for forming a wireless network group per user, comprising:

a plurality of terminals capable of wireless communications, wherein each of said plurality of terminals constituting the wireless communications network is capable of having a respective user's memory device detachably inserted therein, and reading respective ID information held on the respective certain user's detachable memory to perform authentication; and each of said terminals forms the wireless network group with a communication destination having ID information equal to that read from the memory device, wherein each of said terminals writes its own operating information thereof in said memory device and/or reads operating information of another terminal written by said another terminal, and shares operating information of each terminal within said wireless network group, and wherein said operating information is at least one of a data format, a media attribute, a transmission rate, a demodulation method and a frequency band that can be used by the terminal.

2. The wireless communications system according to claim 1, wherein:

each of said terminals carries out wireless communications according to said shared operating information within said wireless network group.

3. The wireless communications system according to claim 1, wherein:
  each of said terminals further includes a display showing that authentication was performed by receiving said memory device.

4. The wireless communications system according to claim 1, wherein:
  said memory device holds visible user information together with said ID information, and
  each of said terminals further includes a display showing said user information read from said memory device.

5. A wireless communications method for forming a wireless network group per user in which a plurality of terminals capable of wireless communications exist, each of said terminals is capable of a receiving user's memory device detachably inserted therein, said method comprising the steps of:
  authenticating, whereby each of said plurality of terminals reads respective ID information held on the respective certain user's detachable memory; and
  constructing a network whereby each of said terminals forms a wireless network group with a communication destination having ID information equal to that read from the memory device,
  wherein each of said terminals, in said step of authentication, writes its own operating information thereof in said memory device when receiving said memory device, and/or, reads operating information of another terminal written by said another terminal, and shares said operating information of each of said terminals, and
  wherein said operating information is at least one of a data format, a media attribute, a transmission rate, a demodulation method and a frequency band that can be used by the terminal.

6. The wireless communications method according to claim 5, wherein:
  after said wireless network group is formed in said step of constructing a network, each of said terminals carries out wireless communications according to said shared operating information.

7. The wireless communications method according to claim 5, further comprising a step of:
  displaying that authentication was performed by each of said terminals by receiving said memory device.

8. The wireless communications method according to claim 5, wherein:
  said memory device holds visible user information together with said ID information, and
  each of said terminals shows said user information read from said memory device.

9. A wireless communications apparatus forming a wireless network group per user and carrying out wireless communications under an environment in which a plurality of terminals capable of wireless communications exist, said apparatus comprising:
  a wireless communications unit transmitting and receiving wireless data;
  a memory device interface capable of receiving user's memory devices detachably inserted therein, wherein:
    each of the plurality of terminals constituting the wireless communications network includes the detachable memory interface and authentication is performed by reading respective ID information from respective certain user's memory devices received in said memory device interface, and
    a wireless network group is formed with a communication destination in accordance with said ID information; and
  a memory region to save operating information thereof and/or operating information of the communication destination, wherein:
  after writing said operating information of a terminal thereof in said memory device received in said memory device interface and/or reading said operating information written by other wireless communications terminals,
  wireless communications are carried out according to said operating information, and
  wherein said operating information is at least one of a data format, a media attribute, a transmission rate, a demodulation method and a frequency band that can be used by the terminal.

10. The wireless communications apparatus according to claim 9, further comprising a display showing which user was authenticated through said memory device as a medium.

11. The wireless communications apparatus according to claim 9, wherein:
  said memory device holds visible user information, together with said ID information, and
  a display showing said user information read from said memory device is further provided.

12. A control method of a wireless communications apparatus having a memory device interface capable of receiving user's memory devices detachably inserted therein, forming a wireless network group per user, and carrying out wireless communications under an environment in which a plurality of terminals capable of wireless communications exist, each of said terminals is capable of receiving the user's detachable memory devices, said method comprising the steps of:
  authenticating, whereby each terminal receives said user's detachable memory and reads respective ID information held therein; and
  constructing a network for forming said wireless network group with a communication destination in accordance with said ID information,
  wherein in said step of authentication, operating information of a terminal is written in said memory device is written, said operating information written by another terminal is read to carry out wireless communications according to said operating information after said wireless network group is formed by said step of network construction, and
  wherein said operating information is at least one of a data format, a media attribute, a transmission rate, a demodulation method and a frequency band that can be used by the terminal.

13. The control method of said wireless communications apparatus according to claim 12, further comprising a step of:
  displaying that authentication was performed by receiving said memory device.

14. The control method of said wireless communications apparatus according to claim 12, wherein:
  said memory device holds visible user information together with said ID information, and
  a step of displaying is included to show said user information read from said memory device.

15. A computer-readable medium encoded with a computer program which is written to execute on a computer system processing to form a wireless network group per user by a wireless communications apparatus equipped with a memory device interface capable of receiving user's detachable memory detachably inserted therein under an environment in which a plurality of terminals capable of wireless communications exist, each of said terminals is capable of receiving the user's memory device, said program comprising the steps of:

authenticating, whereby each terminal receives said user's memory devices and reads respective ID information therein; and constructing a network for forming a wireless network group with a communication destination in accordance with said ID information, wherein each of said terminals, in said step of authentication, writes its own operating information thereof in said memory device when receiving said memory device, and/or, reads said operating information of a terminal written by said another terminal, and shares said operating information of each of said terminals, and wherein said operating information is at least one of a data format, a media attribute, a transmission rate, a demodulation method and a frequency band that can be used by the terminal.

* * * * *

UNITED STATES PATENT AND TRADEMARK OFFICE
CERTIFICATE OF CORRECTION

PATENT NO. : 7,254,418 B2
APPLICATION NO. : 10/316913
DATED : August 7, 2007
INVENTOR(S) : Jun Iwasaki It is certified that error appears in the above-identified patent and that said Letters Patent is hereby corrected as shown below:

Column 7, line 49, please insert the following text after "it is possible to":
--mutually authenticate the user very simply and surely by using the memory card as a medium.

Further, when a data-writable/readable memory card is employed as an authentication medium, information from each equipment (for example, operating information of the equipment) can also be written on the memory card, so that efficient transmission can be made by knowing the equipment information in advance prior to transmission. Still further, not only networking the equipment purchased by the user, there is a feature of easily building a network out of a TV or a camcorder even at a hotel of a travel destination.

In the present preferred embodiment, construction of a home wireless communications network desired by the user is undertaken in a three-step procedure wherein after the "initial setting" and "authentication work" are carried out, "operation" is performed.

In using a wireless communications network according to the present preferred embodiment, the user is required to carry out an "initial setting operation" to make a memory card of each user. Fig. 3 shows a flow chart of a processing procedure for the initial setting operation to carry out authentication in a domestic wireless network using a memory card in this manner for an authentication medium.

First, the user prepares his/her memory card (step S1). Then, insert the memory card into a piece of equipment capable of reading and writing the memory card (step S2) and write his/her own ID information on this card (step S3).--

Column 7, line 65, change "S1" to --S11--.

Column 8, line 66, change "mutually authenticate the user very simply and surely by suing the memory card as a medium." to --program code by the central controller 103 in each wireless communications apparatus 100.--

Column 9, delete lines 1-27.

UNITED STATES PATENT AND TRADEMARK OFFICE
CERTIFICATE OF CORRECTION

PATENT NO. : 7,254,418 B2
APPLICATION NO. : 10/316913
DATED : August 7, 2007
INVENTOR(S) : Jun Iwasaki It is certified that error appears in the above-identified patent and that said Letters Patent is hereby corrected as shown below:

Column 11, line 64, change "reliefing" to --relieving--.

Column 14, line 17, change "user" to --users--.

Column 15, line 43, change "instant" to --instance--.

Column 16, line 6, change "instant" to --instance--.

Signed and Sealed this

Fourteenth Day of October, 2008

JON W. DUDAS
*Director of the United States Patent and Trademark Office*